United States Patent
Satzger

(10) Patent No.: US 7,080,520 B2
(45) Date of Patent: Jul. 25, 2006

(54) AIR CONDITIONING SYSTEM

(75) Inventor: Peter Satzger, Korntal (DE)

(73) Assignee: Robert Bosch GmbH, Stuttgart (DE)

( * ) Notice: Subject to any disclaimer, the term of this patent is extended or adjusted under 35 U.S.C. 154(b) by 641 days.

(21) Appl. No.: 10/312,547

(22) PCT Filed: Mar. 30, 2002

(86) PCT No.: PCT/DE02/01164

§ 371 (c)(1),
(2), (4) Date: Dec. 31, 2002

(87) PCT Pub. No.: WO02/092368

PCT Pub. Date: Nov. 21, 2002

(65) Prior Publication Data

US 2004/0011070 A1 Jan. 22, 2004

(30) Foreign Application Priority Data

May 16, 2001 (DE) .......................................... 101 23 830

(51) Int. Cl.
*F25B 41/04* (2006.01)

(52) U.S. Cl. ...................................... 62/196.4; 62/324.6
(58) Field of Classification Search ................ 62/196.4, 62/324.1, 324.6, 238.7
See application file for complete search history.

(56) References Cited

U.S. PATENT DOCUMENTS

| | | | | |
|---|---|---|---|---|
| 5,291,941 A | * | 3/1994 | Enomoto et al. ............. | 165/62 |
| 5,598,887 A | * | 2/1997 | Ikeda et al. ................. | 165/202 |
| 5,669,224 A | * | 9/1997 | Lenarduzzi .................. | 62/160 |
| 6,125,643 A | * | 10/2000 | Noda et al. ................. | 62/196.4 |
| 6,244,060 B1 | * | 6/2001 | Takano et al. ............. | 62/196.4 |
| 6,422,308 B1 | * | 7/2002 | Okawara et al. ............ | 165/202 |
| 6,536,518 B1 | * | 3/2003 | Trieskey ..................... | 165/240 |

FOREIGN PATENT DOCUMENTS

| | | |
|---|---|---|
| DE | 36 35 353 A | 4/1988 |
| DE | 198 06 654 A | 8/1999 |
| DE | 199 10 985 A1 | 9/2000 |
| EP | 0 945 291 A | 9/1999 |

* cited by examiner

*Primary Examiner*—William E. Tapolcai
(74) *Attorney, Agent, or Firm*—Michael J. Striker

(57) ABSTRACT

The invention is based on a climate control system for a vehicle that is driven by an internal combustion engine (10), having a heating heat exchanger (24) which is connected to a coolant loop (12) of the engine (10) and is preceded upstream of a blower (48) by an evaporator (44), and a compressor (50) in a refrigerant loop (40), during a cooling mode, pumps a refrigerant via a gas cooler (42) and via an expansion valve (54) to the evaporator (44) and during a heating mode pumps it to the evaporator bypassing the gas cooler (42), and between the coolant loop (12) and the refrigerant loop (40) a coupling heat exchanger (38) is provided. It is proposed that the coupling heat exchanger (38) is disposed upstream of the gas cooler (42) on the side of the refrigerant loop (40) on the compression side of the compressor (50); that a bypass line (60) is connected parallel to the gas cooler (42), and the flow through the gas cooler (42) and the bypass line (60) is controlled as a function of operating parameters via a switching valve (62) in the bypass line (60) and one switching valve (64, 66) each at the inlet and outlet, respectively, of the gas cooler (42); and that in the heating mode, the evaporator (44) serves as a heat source.

15 Claims, 5 Drawing Sheets

AIR CONDITIONING SYSTEM

PRIOR ART

Figure 1:
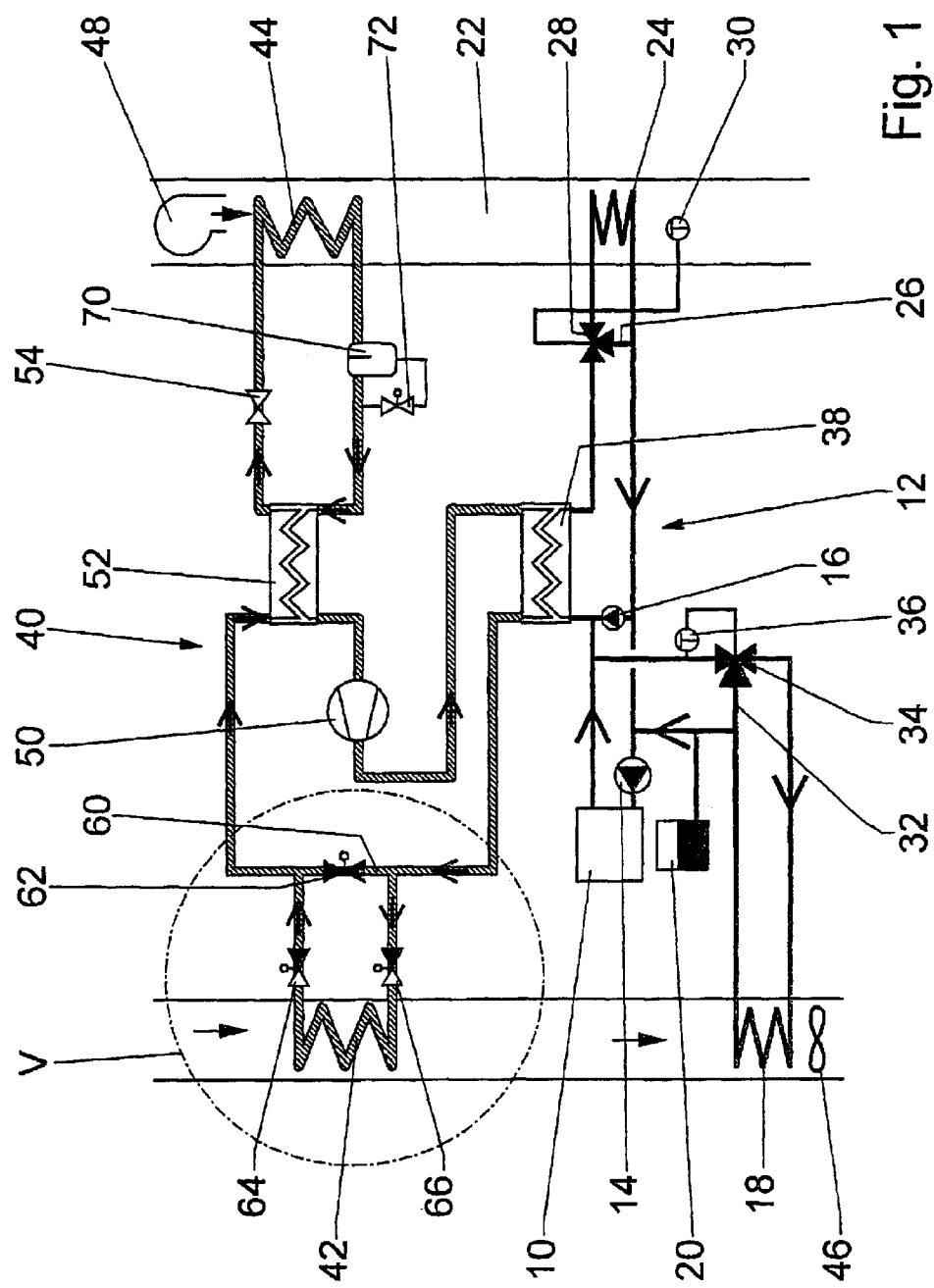

The invention is based on a climate control system as generically defined by the preamble to claim 1.

The use of fuel-consumption optimized internal combustion engines in vehicles has an effect on their climate control because in certain operating ranges, for instance at low outdoor temperatures during the starting phase, enough heat for comfortably heating the vehicle is no longer output to the coolant. Supplementary heaters are therefore necessary to assure comfort at low temperatures and also when needed to defrost the vehicle windows. An air conditioner can also serve as a supplementary heater, especially since increasingly more vehicles come with an air conditioner as standard equipment. The air conditioner is used at low temperatures as a heat pump by reversal of the refrigerant loop. This consumes little energy and has a spontaneous response performance with high heating performance.

Moreover, in climate control systems the conventional refrigerant R134a will be replaced in future by the natural refrigerant, carbon dioxide ($CO_2$), which makes higher heating temperatures possible than R134a. In climate control systems with carbon dioxide as the refrigerant, the heat output is effected not by way of condensation of the refrigerant in a condenser but rather at a supercritical pressure in a gas cooler. If this climate control system is used as a heat pump by reversal of the circulation, then the heat uptake is effected via the gas cooler. However, a substantial disadvantage of such a heat pump is that the gas cooler ices up on the air side at low outdoor temperatures. The engine radiator, which as a rule is downstream in the air flow, thus experiences only an inadequate flow through it of cooling air, and in that case adequate cooling of the engine is not assured.

From German Patent Disclosure DE 198 06 654 A1, a climate control system for vehicles is known that uses carbon dioxide as the refrigerant that circulates in a refrigerant loop in a phased liquid or gaseous state. A compressor pumps the refrigerant, in a cooling mode, via a gas cooler, an inner heat exchanger, an expansion device, an evaporator, and the inner heat exchanger back to the intake side at low pressure. In the process, the refrigerant in the gas cooler gives up some of the heat that was generated by the compression in the compressor. Some heat is transmitted in the inner heat exchanger to the cooler refrigerant flowing back to the intake side. In the expansion device, the refrigerant is expanded to a temperature that is below the ambient temperature, so that in the evaporator it can extract heat from the air that flows into the climate control system and as a result can optionally simultaneously drive the air. The air is then brought to the desired temperature by means of a downstream heating heat exchanger.

By the switchover of flow dividers, the compressor pumps the refrigerant during a heating mode first via the evaporator, which now experiences a flow through it in the reverse direction. The refrigerant gives up some of the heat generated by the compression to the air flowing into the climate control system. This air then heats the passenger compartment and defrosts the windows. If in certain operating phases of the engine the heating heat exchanger is cooler than the air flowing through it, then heat is furthermore output to the coolant loop of the engine, leading to a delayed input of heat into the passenger compartment. Since no moisture is extracted from the air and instead it must be expected that the air will absorb residual moisture from the evaporator, it must be feared that later the moisture from the saturated air will be deposited on the cold vehicle windows and impede vision.

Downstream of the evaporator, the refrigerant is depressurized in the expansion device to a lower temperature, so that along its course to the intake side of the compressor, in a coupling heat exchanger disposed between the coolant loop and the refrigerant loop, it can absorb heat from the coolant loop. By means of this kind of climate control system, it is possible to increase the temperature in the passenger compartment in cold-weather conditions, but at the expense of the engine.

From European Patent Disclosure EP 0 945 291 A1, a device and a method for heating and cooling a useful space in a motor vehicle are also known. In the heating mode, the refrigerant is compressed by a compressor, and via a 3/2-way valve it reaches an evaporator, in which it outputs some of the heat generated by the compression to the colder air in the passenger compartment. From the evaporator, the refrigerant flows to an expansion device, in which it is cooled down so far that it can absorb heat from the ambient air in a downstream gas cooler. Additional heat is delivered to the refrigerant in a downstream exhaust gas heat exchanger that is subjected to hot exhaust gases from the engine.

From the exhaust gas heat exchanger, the refrigerant reaches the compressor again, and the refrigerant loop is thus closed. If the refrigerant is expanded in the expansion device to a temperature that is below the ambient temperature, then the air flowing through the gas cooler can be cooled down to a temperature below the temperature of saturation. In that case, water condenses out of the aspirated ambient air. If the temperature is below the sublimation line of the water, then the water changes to the solid phase, and the gas cooler ices up. Since as a rule a radiator of the engine precedes the gas cooler in the flow direction of the air, icing of the gas cooler is a threat to proper cooling of the engine. To avoid excessive icing, in critical ambient conditions a bypass line is therefore opened via a 3/2-way valve, so that the gas cooler is short-circuited. The refrigerant bypasses the gas cooler and flows directly to the exhaust gas heat exchanger and from there to the intake side of the compressor.

The passenger compartment air flowing through the evaporator is indeed heated, but the moisture is not extracted from it as in the cooling mode. Instead, the warm air will absorb the residual moisture that has remained in the evaporator and deposit it as a fog on the colder vehicle windows in the passenger compartment. Adequate dehumidification of the air can be achieved in such a system only by means of additional heat exchangers in the climate control system, but this necessitates an additional installation volume that in many vehicles is not available.

ADVANTAGES OF THE INVENTION

According to the invention, the coupling heat exchanger on the side of the refrigerant loop is disposed on the compression side of the compressor, upstream of the gas cooler. Parallel to the gas cooler is a bypass line, and a switching valve in the bypass line and one switching valve each at the inlet and outlet of the gas cooler control the flow rate through the gas cooler and the bypass line as a function of operating parameters. In the heating mode, the evaporator serves as a heat source.

In the climate control system of the invention, the refrigerant flows in the same direction through the expansion device, in the form of an expansion valve, and through the evaporator in both the heating mode and the cooling mode. As a result, the evaporator need not be designed additionally for heat output operation, which is always a compromise for both the heating mode and the cooling mode. In the heating mode, the climate control system acts as a heat pump, and the evaporator acts as a heat source, utilizing the heat produced upon the dehumidification of the air. After that, the compressor compresses the refrigerant. The heat thus produced is output via the coupling heat exchanger to the coolant of the coolant loop, advantageously in the vicinity of a heating heat exchanger for the passenger compartment, between the engine and the heating heat exchanger. As a result, a large quantity of heat can be input into the coolant and utilized, without significant delay or losses, for both heating the passenger compartment and rapidly heating the engine to an optimal operating temperature. No additional installation space is taken up for that purpose. The air dried in the evaporator heats on passing through the heating heat exchanger, and as a result the relative humidity of the air drops further, so that no fog can form on the vehicle windows.

A bypass line is expediently disposed parallel to the heating heat exchanger, so that depending on the demand for heat, the volumetric flow of coolant can be distributed between the heating heat exchanger and the bypass line by means of a heat regulating valve that is either temperature-controlled or controlled by the heating regulator. Optionally, in the cooling mode or in order to heat the engine to an optimal operating temperature faster in the starting phase, the entire volumetric flow can flow through the bypass line.

In one embodiment of the invention, it is proposed that a throttle valve be provided in the refrigerant loop upstream of the coupling heat exchanger. As a result, the counterpressure of the compressor can be increased, making a greater input of heat by the compressor possible. By means of the throttle valve, the refrigerant is depressurized to an allowable maximum pressure in the coupling heat exchanger. To improve the efficiency, the coupling heat exchanger expediently operates by the countercurrent principle. It is also advantageous to produce the coupling heat exchanger by microstructuring. A heat exchanger of this kind is suitable for high pressures and can be produced economically with a compact design. Further details of microstructured heat exchangers can be learned from the earlier German Patent Application DE 199 10 985.0.

In the cooling mode, the compressor also pumps the refrigerant via the coupling heat exchanger, where it is cooled by the coolant. After that, it reaches the gas cooler, where it is cooled still further by the ambient air. For further cooling, an inner heat exchanger is expediently disposed downstream of the gas cooler; this heat exchanger experiences a flow on the countercurrent principle by the compressed refrigerant in one direction and by the depressurized refrigerant downstream of the evaporator in the other. A bypass line with a safety valve is connected parallel to the inner heat exchanger. The thus-cooled refrigerant, upon expansion in an expansion device, for instance in the form of an expansion valve, cools down to the desired temperature, so that the refrigerant can absorb heat when it then flows through the evaporator. The refrigerant now flows via the inner heat exchanger back to the intake line of the compressor.

In the heating mode, in which the gas cooler is short-circuited via a bypass line, the possibility exists under critical conditions that the temperature and thus the pressure of the refrigerant at the evaporator will fall below a certain value, and as a result the final compression temperature of the refrigerant can exceed a maximum allowable value. To prevent this, the safety valve in the bypass line is opened toward the inner heat exchanger, so that the inner heat exchanger is short-circuited. As a result, the refrigerant flowing back to the compressor is not additionally heated, and the final compression temperature ranges within allowable limits.

If the evaporator does not suffice as a heat source in the heating mode, then it is advantageous to provide a further evaporator, which is exposed not to the heating air for the passenger compartment but rather to the output door. Because of the greater input of heat, it is thus additionally achieved that even if the additional evaporator ices up, consequent damage to the engine need not be expected.

Upon a change from the cooling mode to the heating mode, the refrigerant that is in the liquid state in the gas cooler must be pumped into the working region of the system. To that end, the switching valve at the inlet to the gas cooler and the switching valve in the bypass line of the gas cooler are closed, while the switching valve at the outlet of the gas cooler is opened, until such time as the pressure at the outlet of the compressor has reached an upper set-point value. After that, the switching valve in the bypass line opens and the switching valve at the outlet of the gas cooler closes, until the pressure at the outlet of the compressor has dropped to a lower set-point value. This process may have to be repeated again. To simplify the climate control system, it can be advantageous for the switching valve at the outlet of the gas cooler to be embodied as a check valve.

DRAWING

Further advantages will become apparent from the ensuing description of the drawings. In the drawings, exemplary embodiments of the invention are shown. The drawing, description and claims include numerous characteristics in combination. One skilled in the art will expediently consider the characteristics individually as well and put them together to make useful further combinations.

Figure 2:
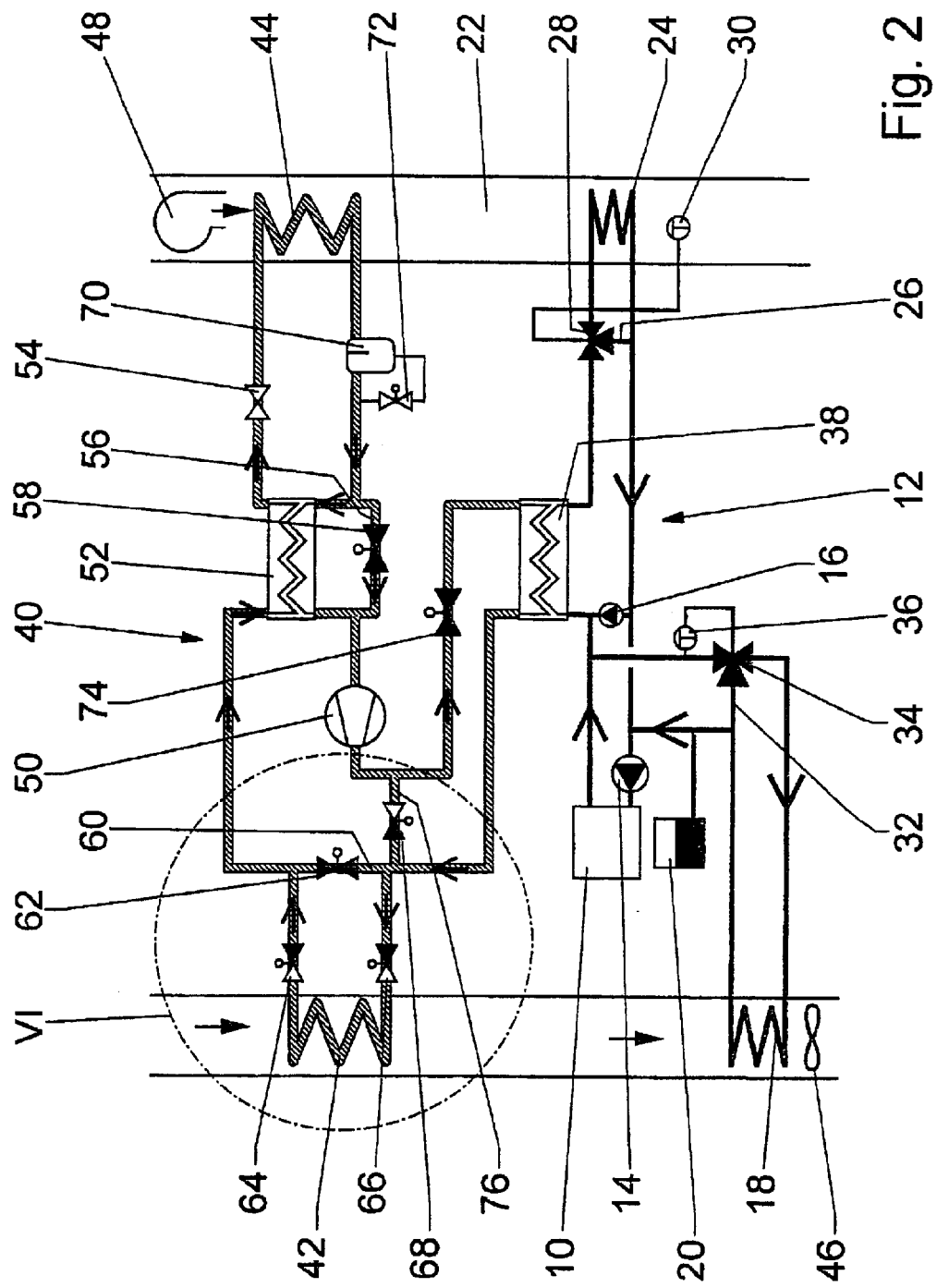
Figure 3:
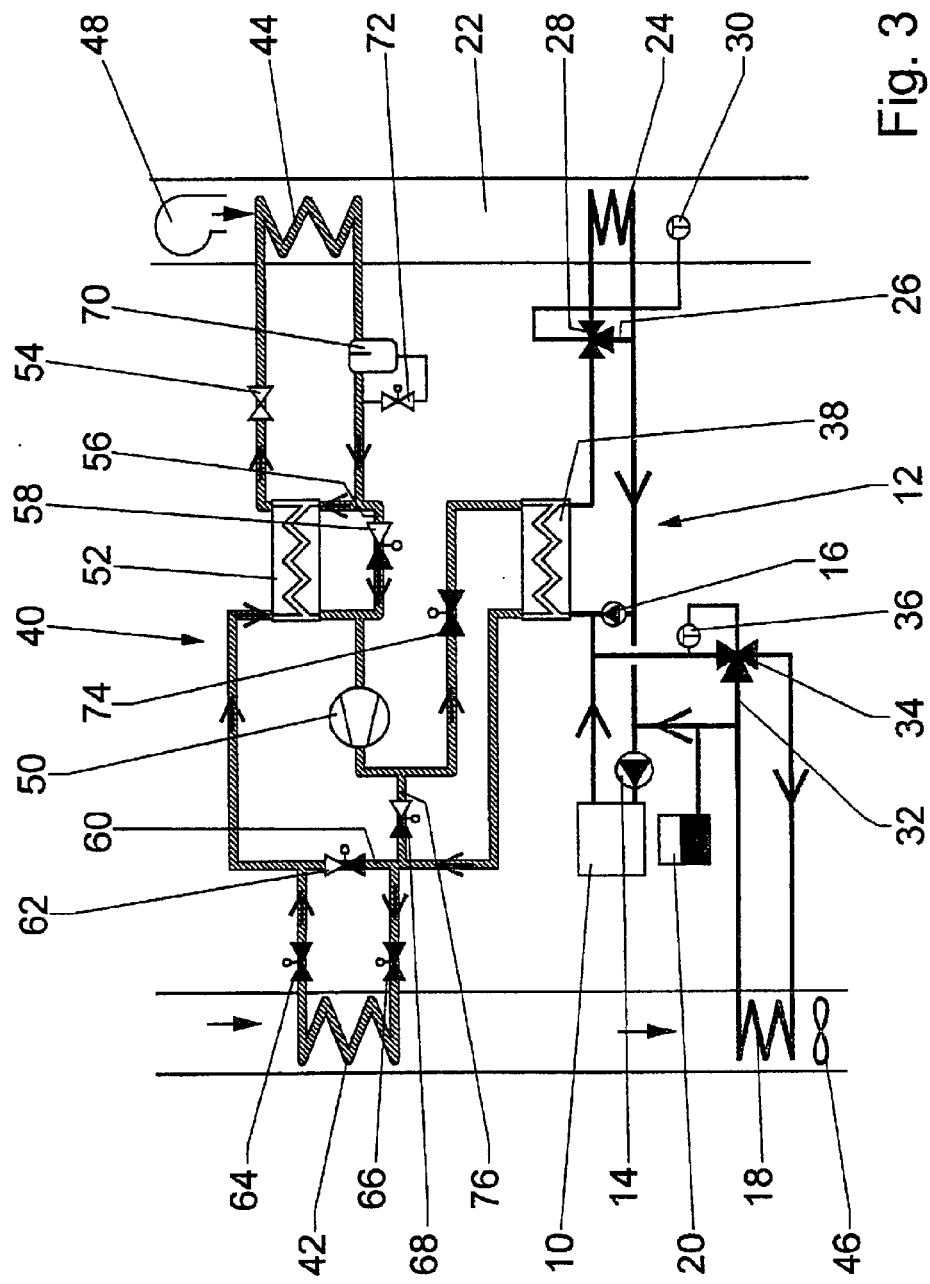
Figure 4:
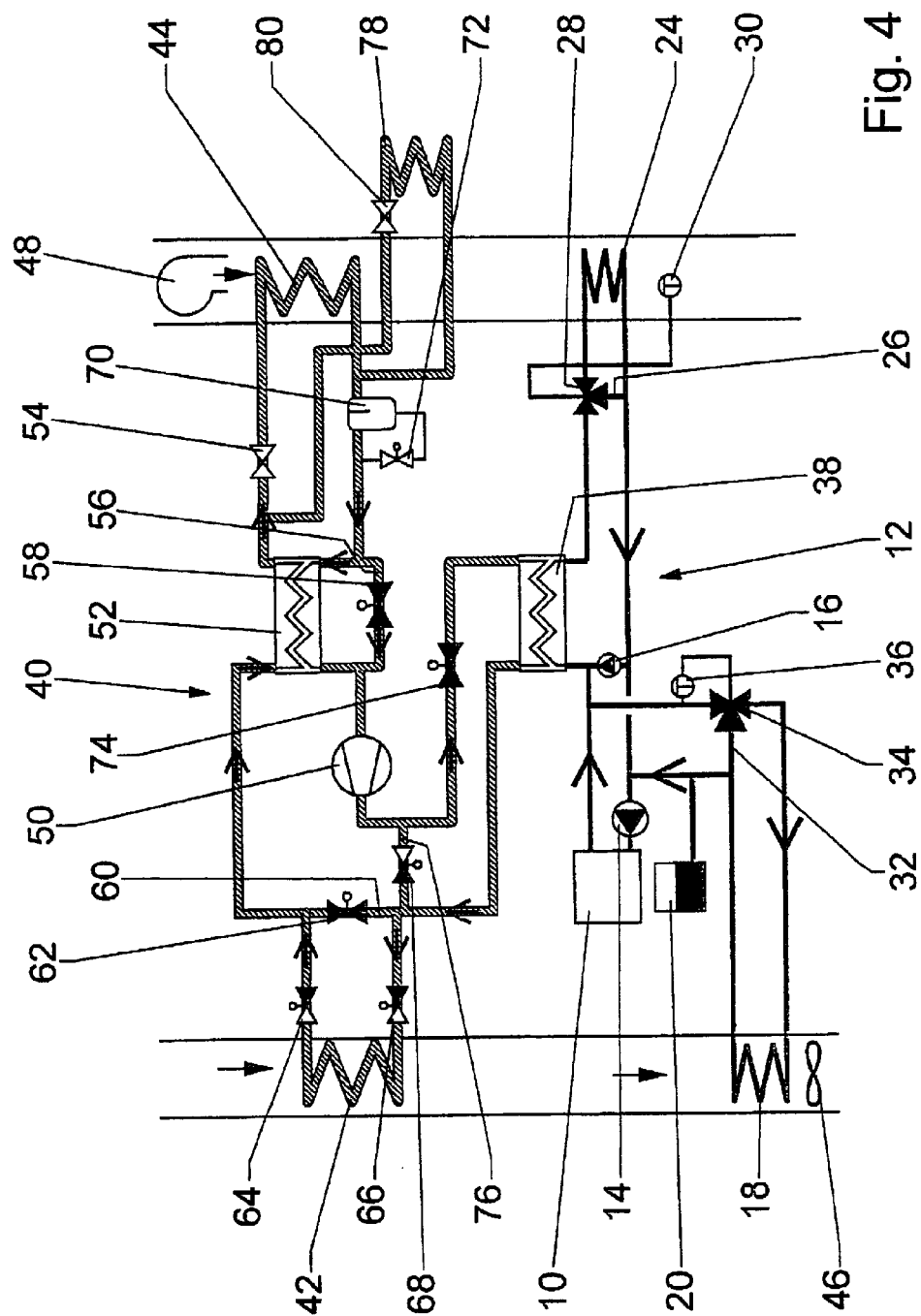
Figure 5:
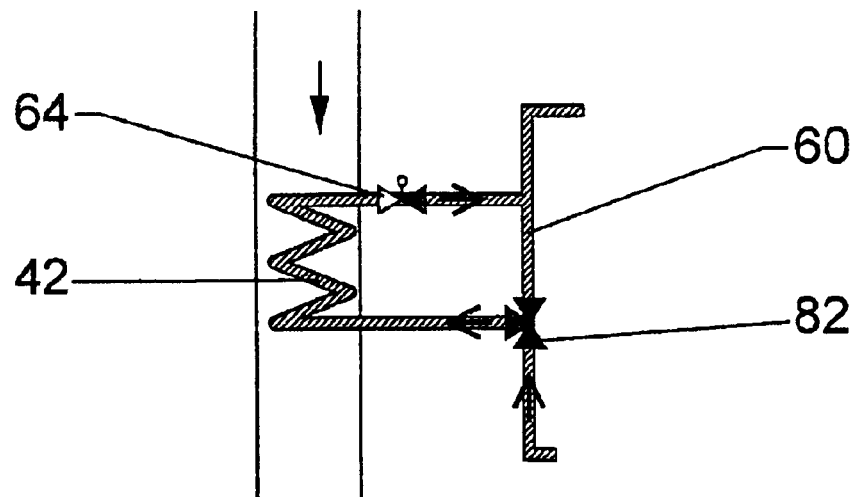

Shown are:

FIG. 1, a schematic illustration of a climate control system in the heating mode;

FIG. 2, a variant of FIG. 1 with a plurality of switching valves;

FIG. 3, a schematic illustration of a climate control system in the cooling mode;

FIG. 4, a variant of FIG. 2 with an additional evaporator;

FIG. 5, a variant of a detail represented by the line V in FIG. 1; and

Figure 6:
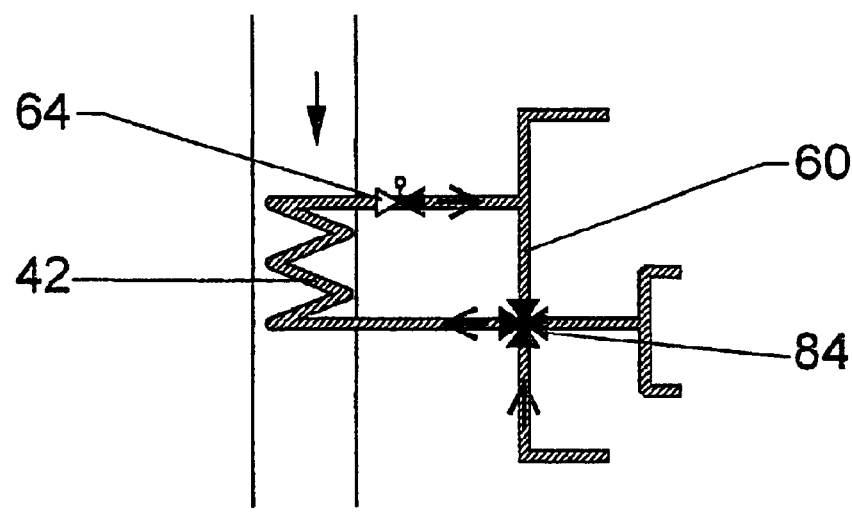

FIG. 6, a variant of a detail represented by the line VI in FIG. 2.

DESCRIPTION OF THE EXEMPLARY EMBODIMENTS

A climate control system of the invention includes a coolant loop 12 and a refrigerant loop 40. The flow course of the respective media is indicated by arrows. In the coolant loop 12, the coolant pump 14 pumps coolant through an internal combustion engine 10 and from there to a radiator 18 that cooperates with a fan 46. From the radiator 18, the coolant flows back to the coolant pump 14. A bypass line 32 is provided parallel to the radiator 18. A 3-way valve 34, which is disposed at the branching point of the bypass line 32 and is controlled as a function of the temperature of the coolant by means of a temperature sensor 36, distributes the coolant streams to the radiator 18 and the bypass line 32. A compensation vessel 20 is disposed in the coolant loop 12 in order to compensate for temperature-caused changes in the volume of the coolant.

The coolant loop 12 furthermore includes a heating heat exchanger 24, which is disposed in an air conditioner 22. A heat regulating valve 28 regulates the inflow of coolant to the heating heat exchanger 24 as a function of the temperature of the air flowing into the passenger compartment, doing so by opening and closing a bypass line 26 connected parallel to the heating heat exchanger 24. To that end, a temperature sensor 30 is provided downstream of the heating heat exchanger 24.

In operating ranges of the engine 10 in which the heat of the coolant is insufficient to heat the passenger compartment, such as in the starting phase of the engine 10 at low ambient temperatures, heat is additionally input into the coolant loop 12 from the refrigerant loop 40 via a coupling heat exchanger 38. The coupling heat exchanger 38 is disposed in the coolant loop 12 between the engine 10 and the heating heat exchanger 24 and in the refrigerant loop 40 between a compressor 50 and a gas cooler 42. On the countercurrent principle, it experiences a flow through it of coolant on the one hand and refrigerant on the other. In order for the quantity of heat input into the coolant loop by the coupling heat exchanger 38 to be delivered to the coupling heat exchanger 24, the coolant loop 12 is short-circuited via an additional, regulatable coolant pump 16 in the region between the engine 10 and the coupling heat exchanger 38.

The compressor 50 compresses the refrigerant to high pressure. In the process, the refrigerant heats up and then flows into the coupling heat exchanger 38, where it gives up heat to the coolant. From there, in the heating mode, it bypasses the gas cooler 42 through a bypass line 60 with an open switching valve 62 to reach an inner heat exchanger 52, where still further heat is extracted from it. After that, in an expansion device in the form of an expansion valve 54, the refrigerant is depressurized to the evaporation pressure, in the course of which it cools down sharply, so that on flowing through the downstream evaporator 44, it can absorb the heat that occurs upon drying of the air flowing into the air conditioner 22. The air is aspirated by a blower 48 from the environment or from the passenger compartment and pumped through the air conditioner 22 with the evaporator 44 and the downstream heating heat exchanger 24. The gaseous refrigerant flowing back to the compressor 50 precipitates liquid into a collector 70 that is carried away via a valve 72 or a bore in the outlet line of the collector 70. It also picks up still further heat in the inner heat exchanger 52 and is compressed once again to the allowable final compression temperature by the compressor 50. If the temperature of the refrigerant downstream of the compressor 50 increases above a certain value, then by means of a safety 58 a bypass line 56 to the inner heat exchanger 52 is opened (FIG. 2), in order to keep the final compression temperature within allowable limits.

One embodiment of the invention, in the coolant loop 40, provides further valves with regulating and safety functions (FIG. 2). For instance, downstream of the compressor 50 is a continuously variable throttle valve 74, with the aid of which a higher final pressure of compression can be generated, which makes it possible to input a greater quantity of heat to the coolant loop 12. Downstream of the compressor 50, the pressure is reduced down to the allowable pressure again in the coupling heat exchanger 38.

In the cooling mode, the climate control system functions as shown in FIG. 3. In this operating state, the compressor 50 pumps the refrigerant through the gas cooler 42 via the coupling heat exchanger 38. The throttle valve 74 and the switching valves 64 and 66 at the outlet and inlet of the gas cooler 42 are opened, while the switching valve 62 in the bypass line 60 parallel to the gas cooler 42 is closed. In a simplified version, the switching valve 64 is embodied as a check valve. Thus the refrigerant is cooled first in the coupling heat exchanger 38 and then in the gas cooler 42. When circumstances make cooling in the coupling heat exchanger 38 unnecessary, then coupling heat exchanger 38 can be short-circuited via a bypass line 76 with a switching valve 68.

Upon a switchover of the climate control system from the cooling mode to the heating mode, the liquid refrigerant must be pumped out of the gas cooler 42, so that it can be utilized in the working region of the climate control system. To that end, during the heating mode the switching valve 62 is briefly closed and the switching valve 64 is opened. The refrigerant is then aspirated, by opening of the expansion valve 54, until such time as the pressure at the outlet of the compressor 50 has reached a set-point value. On the basis of this operating parameter, the switching valve 62 in the bypass line 60 opens again, and the switching valve 64 closes. If the set-point value is undershot during the heating mode, this process is repeated. To improve the heating performance, a further evaporator 78 (FIG. 4) can be disposed in the refrigerant loop 12, parallel to the evaporator 44. This additional heat source can be bathed by outdoor air, for instance, without the cooling of the engine 10 being threatened from icing up of this heat exchanger. A second expansion valve 80 is disposed upstream of the further evaporator.

In a simplified embodiment of the invention, the switching valves 62 and 66 can be combined into a 3/2-way valve 82 (FIG. 5). In a first position, the 3/2-way valve 82, in the cooling mode, connects the coupling heat exchanger 38 with the gas cooler 42, while the bypass line 60 is blocked. In a second position, the 3/2-way valve 82, in the heating mode, connects the coupling heat exchanger 38 with the bypass line 60, while the gas cooler 42 is blocked. In a third position, the 3/2-way valve 82, upon switchover to the heating mode, connects the gas cooler 42 with the bypass line 60, while the line from the coupling heat exchanger 38 is blocked.

In another simplified variant (FIG. 6), the switching valves 62 and 66 and the switching valve 68 can be combined into a 4/2-way valve 84, in which in two opposed positions of the 4/2-way valve 84 the bypass line 76 is connected, parallel to the coupling heat exchanger 38, to the gas cooler 42 in the cooling mode, and in other the two positions, in the heating mode, the coupling heat exchanger 38 is connected to the bypass line 60 parallel to the gas cooler 42.

LIST OF REFERENCE NUMERALS

10 Internal combustion engine
12 Coolant loop
14 Coolant pump
16 Addition coolant pump
18 Radiator
20 Compensation vessel
22 Climate control system
24 Heating heat exchanger
26 Bypass line
28 Heat regulating valve 30 Temperature sensor
32 Bypass line
34 3-way valve
36 Temperature sensor
38 Coupling heat exchanger
40 Refrigerant loop
42 Gas cooler
44 Evaporator
46 Fan
48 Blower
50 Compressor
52 Inner heat exchanger
54 Expansion valve
56 Bypass line
58 Safety valve
60 Bypass line
62 Switching valve
64 Switching valve
66 Switching valve
68 Switching valve
70 Collector
72 Valve
74 Throttle valve
76 Bypass line
78 Further evaporator
80 Switching valve
82 3/2-way valve
84 4/2-way valve

What is claimed is:

1. A climate control system for a vehicle that is driven by an internal combustion engine (10), having a heating heat exchanger (24) which is connected to a coolant loop (12) of the engine (10) and is preceded upstream of a blower (48) by an evaporator (44), and a compressor (50) in a refrigerant loop (40), during a cooling mode, pumps a refrigerant via a gas cooler (42) and via an expansion valve (54) to the evaporator (44) and during a heating mode pumps it to the evaporator bypassing the gas cooler (42), and between the coolant loop (12) and the refrigerator loop (40) a coupling heat exchanger (38) is provided, characterized in that the coupling heat exchanger (38) is disposed upstream of the gas cooler (42) on the side of the refrigerant loop (40) on the compression side of the compressor (50); that a bypass line (60) is connected parallel to the gas cooler (42), and the flow through the gas cooler (42) and the bypass line (60) is controlled as a function of operating parameters via a switching valve (62) in the bypass line (60) and one switching valve (64, 66) each at the inlet and outlet, respectively, of the gas cooler (42); and that in the heating mode, the evaporator (44) serves as a heat source.

2. The climate control system of claim 1, characterized in that the refrigerant is a medium in which the heat output is effected at supercritical pressure.

3. The climate control system of claim 2, characterized in that the refrigerator is carbon dioxide.

4. The climate control system of claim 1, characterized in that the switching valve (64) at the outlet of the gas cooler (42) is embodied as a check valve.

5. The climate control system of claim 1, characterized in that the switching valve (62) in the bypass line (26) assigned to the gas cooler (42) and the switching valve (66) at the inlet to the gas cooler (42) are combined into one 3/2-way valve (82) (FIG. 5).

6. The climate control system of claim 1, characterized in that the coupling heat exchanger (38) on the side of the coolant loop (12) is connected between the engine (10) and the heating heat exchanger (24).

7. The climate control system of claim 6, characterized in that the heating heat exchanger (24) is bypassed by a bypass line (26), at the branching point of which a heat regulating valve (28) controlled by the temperature of the heating air is disposed.

8. The climate control system of claim 1, characterized in that a throttle valve (74) is provided on the side of the refrigerant loop (40) upstream of the coupling heat exchanger (38).

9. The climate control system of claim 5, characterized in that upstream of the throttle valve (74), a bypass line (76) branches off that bypasses the coupling heat exchanger (38) and has a switching valve (68).

10. The climate control system of claim 9, characterized in that the switching valve (62) in the bypass line (26) assigned to the gas cooler (42) the switching valve (66) at the inlet to the gas cooler (42), and the switching valve (68) in the bypass line (76) assigned to the coupling heat exchanger (38) are combined into one 4/2-way valve (84).

11. The climate control system of claim 1, characterized in that the coupling heat exchanger (38) operates by the countercurrent principle.

12. The climate control system of claim 1, characterized in that the coupling heat exchanger (38) is produced in microstructured form.

13. The climate control system of claim 1, characterized in that downstream of the gas cooler (42), an inner heat exchanger (52) is disposed, which on the countercurrent principle experiences a flow through it on the one hand of the compressed refrigerant and on the other of the depressurized refrigerant downstream of the evaporator (44), and a bypass line (56) with a safety valve (58) is connected parallel to the inner heat exchanger (52).

14. The climate control system of claim 1, characterized in that parallel to the evaporator (44), a further evaporator (78) is provided, which is exposed to the outside air.

15. A method for operating a climate control system of claim 1, characterized in that upon a change from the cooling mode to the heating mode, the switching valve (66) at the inlet to the gas cooler (42) and the switching valve (62) in the bypass line (60) of the gas cooler (42) are closed, while the switching valve (64) at the outlet of the gas cooler (42) and the expansion valve (54) are opened, until such time as the pressure at the outlet of the compressor (50) has reached an upper set-point value, whereupon the switching valve (62) in the bypass line (60) opens and the switching valve (64) at the outlet of the gas cooler. (42) closes, until the pressure at the outlet of the compressor (50) has dropped to a lower set-point value.

* * * * *